(12) United States Patent
Chien

(10) Patent No.: US 7,462,027 B2
(45) Date of Patent: Dec. 9, 2008

(54) MOLD APPARATUS

(75) Inventor: Yang-Chang Chien, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 247 days.

(21) Appl. No.: 11/437,340

(22) Filed: May 19, 2006

(65) Prior Publication Data

US 2006/0286196 A1     Dec. 21, 2006

(30) Foreign Application Priority Data

Jun. 16, 2005   (CN)   ............... 2005 2 0060126.4

(51) Int. Cl.
*B29C 33/30*   (2006.01)

(52) U.S. Cl. ............... 425/192 R; 425/193; 425/195; 425/808; 425/577; 425/DIG. 127

(58) Field of Classification Search ............ 425/192 R, 425/193, 195, 408, 808, 188, 185, 414, 466, 425/467, 577, 451.9, DIG. 127
See application file for complete search history.

(56) References Cited

U.S. PATENT DOCUMENTS

| | | | | | |
|---|---|---|---|---|---|
| 2,072,349 | A | * | 3/1937 | Wayne | 264/160 |
| 2,367,962 | A | * | 1/1945 | Reibold et al. | 425/408 |
| 3,196,485 | A | * | 7/1965 | Battenfeld et al. | 425/408 |
| 3,317,961 | A | * | 5/1967 | Drevalas et al. | 425/308 |
| 3,341,897 | A | * | 9/1967 | Susuki et al. | 425/577 |
| 3,737,268 | A | * | 6/1973 | Ryder | 425/192 R |
| 3,762,847 | A | * | 10/1973 | Deuter et al. | 425/125 |
| 3,811,811 | A | * | 5/1974 | Horl | 425/192 R |
| 4,046,282 | A | * | 9/1977 | Ruch | 220/270 |
| 4,452,420 | A | * | 6/1984 | Lundquist | 249/175 |
| 4,496,302 | A | * | 1/1985 | Brown | 425/547 |
| 4,828,769 | A | * | 5/1989 | Maus et al. | 264/1.31 |
| 4,889,480 | A | * | 12/1989 | Nakamura et al. | 425/577 |
| 4,900,242 | A | * | 2/1990 | Maus et al. | 425/149 |
| 4,959,002 | A | * | 9/1990 | Pleasant | 425/192 R |
| 4,971,543 | A | * | 11/1990 | Minor | 425/193 |
| 5,015,426 | A | * | 5/1991 | Maus et al. | 264/40.5 |
| 5,053,173 | A | * | 10/1991 | Sticht | 264/39 |
| 5,114,329 | A | * | 5/1992 | Nakamura et al. | 425/190 |
| 5,204,127 | A | * | 4/1993 | Prusha | 425/544 |
| 5,206,040 | A | * | 4/1993 | Gellert | 425/549 |
| 5,340,304 | A | * | 8/1994 | Nakamura | 425/577 |
| 5,346,659 | A | * | 9/1994 | Buhler et al. | 264/68 |

(Continued)

FOREIGN PATENT DOCUMENTS

JP    61192529   A   *   8/1986

(Continued)

*Primary Examiner*—Steven P Griffin
*Assistant Examiner*—Seyed Masoud Malekzadeh
(74) *Attorney, Agent, or Firm*—Andrew C. Cheng

(57) ABSTRACT

A mold apparatus includes an upper mold having an upper molding plate and an upper molding core, and a bottom mold having a bottom molding plate for matching with the upper molding plate and a bottom molding core. One of the upper molding plate and the bottom molding plate defines a cavity and a corresponding one of the upper molding core and the bottom molding core is floatingly received and movable in the cavity.

10 Claims, 7 Drawing Sheets

U.S. PATENT DOCUMENTS

| | | | | |
|---|---|---|---|---|
| 5,512,221 A * | 4/1996 | Maus et al. | ................ | 264/2.5 |
| 5,662,946 A * | 9/1997 | Pratt et al. | ................ | 425/190 |
| 5,738,883 A * | 4/1998 | Tanaka | ................ | 425/190 |
| 5,792,392 A * | 8/1998 | Maus et al. | ................ | 264/2.5 |
| 5,972,252 A * | 10/1999 | Saito et al. | ................ | 264/2.2 |
| 6,196,824 B1 * | 3/2001 | Foltuz et al. | ................ | 425/190 |
| 6,206,674 B1 * | 3/2001 | Foltuz et al. | ................ | 425/185 |
| 6,355,190 B1 * | 3/2002 | Ojio et al. | ................ | 264/1.1 |
| 6,428,299 B1 * | 8/2002 | Tanaka et al. | ................ | 425/116 |
| 6,454,984 B1 * | 9/2002 | Saito et al. | ................ | 264/261 |
| 6,976,837 B2 | 12/2005 | Kao | | |
| 7,147,454 B2 * | 12/2006 | Wang | ................ | 425/408 |
| 7,165,961 B2 * | 1/2007 | Jachimski | ................ | 425/193 |
| 2002/0044983 A1 * | 4/2002 | Wieder | ................ | 425/192 R |
| 2002/0117600 A1 * | 8/2002 | Hosoe | ................ | 249/135 |
| 2003/0067088 A1 * | 4/2003 | Scolamiero et al. | ................ | 264/40.4 |
| 2005/0136147 A1 * | 6/2005 | Yang et al. | ................ | 425/406 |
| 2006/0093704 A1 * | 5/2006 | Naito et al. | ................ | 425/572 |
| 2007/0077324 A1 * | 4/2007 | Fujisaki | ................ | 425/345 |

FOREIGN PATENT DOCUMENTS

| | | | |
|---|---|---|---|
| JP | 62016117 A | * | 1/1987 |
| JP | 62111713 A | * | 5/1987 |
| JP | 02018021 A | * | 1/1990 |

* cited by examiner

MOLD APPARATUS

TECHNICAL FIELD

The present invention relates to a mold apparatus, and more particularly relates to a mold apparatus used for hot molding.

BACKGROUND

Mold apparatuses are critical to modern industry. One set of designed mold apparatuses can be used many thousands of times to manufacture thousands of products. However, when the mold apparatus is badly designed, it can affect the quality of the products produced.

It is known to all that mold apparatuses can be used in hot molding processes and cold molding processes according to temperature of molding materials. A 'hot' molding process means a process for manufacturing molding products, during which the materials to be manufactured are heated to be molded, and then be cooled to released from the mold. Typically, a mold comprises a bottom mold and an upper mold separating from each other at a mold-assembling surface.

Referring to FIG. 6A, which is a schematic, cross-sectional view of a conventional mold apparatus used to manufacture an optical lens 30a as shown in FIG. 7A, the mold apparatus includes a bottom mold 10a and an upper mold 20a, which must be assembled compactly along the mold-assembling surface. Thus two opposite surfaces of the optical lens 30a with good homocentric degree and coaxial degree could be obtained. When the bottom mold 10b and the upper mold 20b become mis-aligned during assembled, as shown in FIG. 6B, shifts will occur to the axes of the two opposite surfaces of the optical lens 30b obtained thereby, as shown in FIG. 7B. When bottom mold 10c and upper mold 20c are divergingly assembled as shown in FIG. 6C, divergence will occur to axes of two opposite surfaces of optical lens 30c obtained thereby, as shown in FIG. 7C. That is, homocentric degree and coaxial degree of two opposite surfaces are improper.

However, optical lenses are usually used as critical components in optical systems. If faults as described above in FIGS. 7B~7C cannot be efficiently controlled, qualities of optical lenses will be badly affected and serious errors will occur in the optical systems.

At the same time, in actual industry, molding portion of a mold apparatus, that is, a molding core, will be manufactured separately and then be used as an upper to a pre-selected standard mold base. The molding core and the mold base are usually assembled in interference fit shape, thus assembly error will affect accuracy of the molding core, and further affect quality of optical products.

Therefore, a heretofore-unaddressed need exists in the industry to address the aforementioned deficiencies and inadequacies associated with mold apparatus.

SUMMARY

A mold apparatus includes an upper mold having an upper molding plate and an upper molding core, and a bottom mold having a bottom molding plate for matching with the upper molding plate and a bottom molding core. One of the upper molding plate and the bottom molding plate defines a cavity and a corresponding one of the upper molding core and the bottom molding core is floatingly received and movable in the cavity.

Other advantages and novel features will become more apparent from the following detailed description when taken in conjunction with the accompanying drawings.

BRIEF DESCRIPTION OF THE DRAWINGS

Many aspects of a mold apparatus used for hot molding process can be better understood with reference to the following drawings. The components in the drawings are not necessarily drawn to scale, the emphasis instead being placed upon clearly illustrating the principles of the composite mold and the method for making the same. Moreover, in the drawings, like reference numerals designate corresponding parts throughout the several views.

DETAILED DESCRIPTION OF THE EMBODIMENTS

The present invention is further described below, taking injection molding as an exemplification and by reference to the figures.

Figure 1:
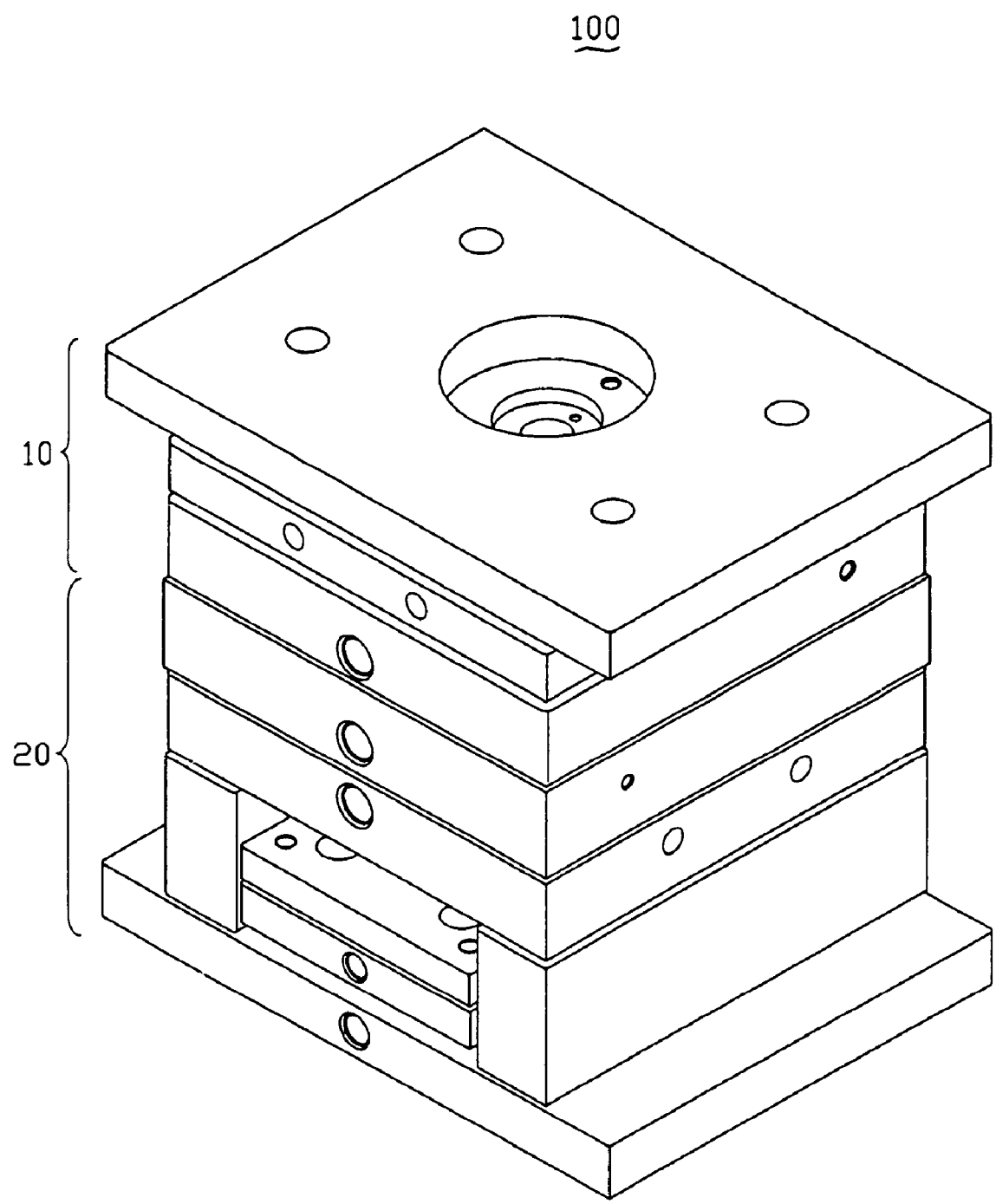
FIG. 1 is a schematic, isometric view showing a mold for injection molding of a preferred embodiment.
Figure 2:
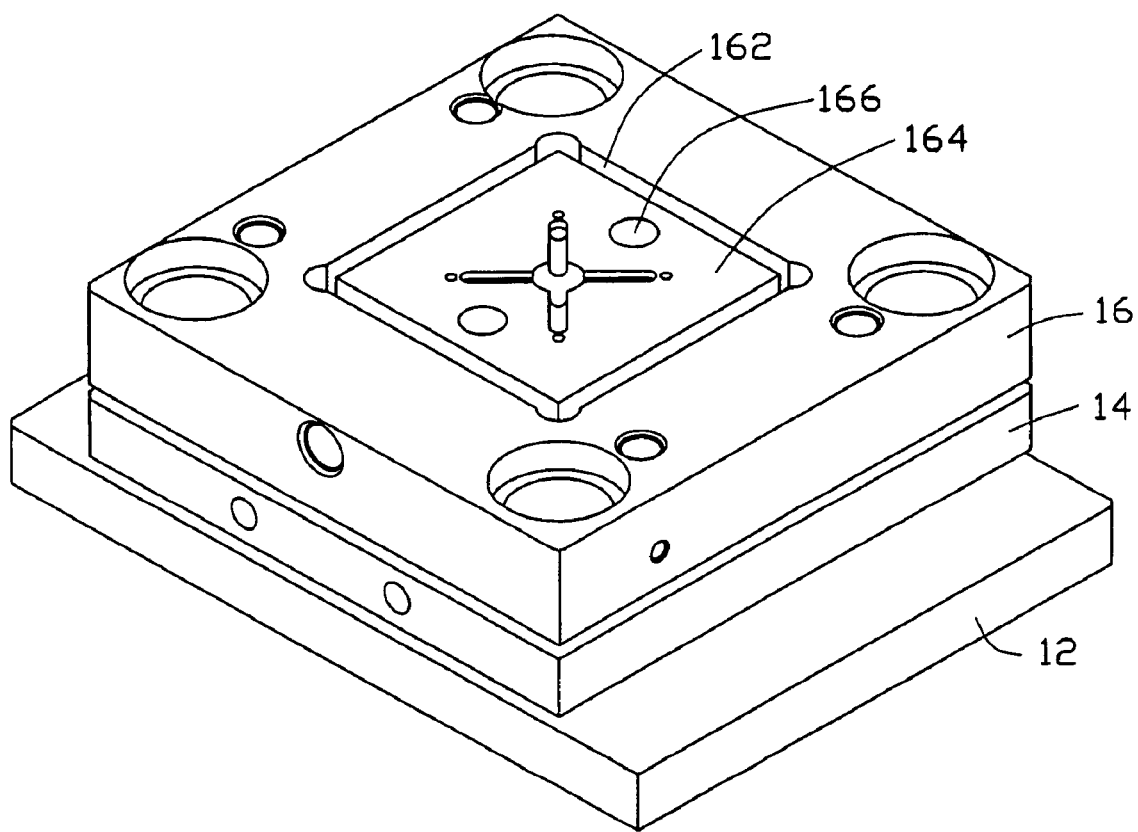
FIG. 2 is a schematic, isometric view showing a structure of a upper mold of the mold for injection molding of FIG. 1.

Referring to FIG. 1, a mold apparatus 100 for injection molding comprises an upper mold 10 and a bottom mold 20 assembled with each other. Referring to FIG. 2, the upper mold 10 in turn comprises a clamp plate 12, an upper spacer plate 14, and an upper molding plate 16. Except for the upper molding plate 16, the upper mold 10 can be comprised of other components known to the art, and should not be restricted by FIG. 2. An upper receiving cavity 162 is defined in a center of the upper molding plate 16. An upper core 164 is received in the upper receiving cavity 162. A volume of the upper receiving cavity 162 is larger than a volume of the upper core 164, the upper molding plate 16 and the upper core 164 are assembled in clearance fit shape, that is, they are separated by a gap. Thus the upper core 164 is floatingly received, and movable in the upper receiving cavity 162, relative to the upper molding plate 16. A thickness of the upper core 164 could be equal to, or larger than a depth of the upper receiving cavity 162.

Figure 3:
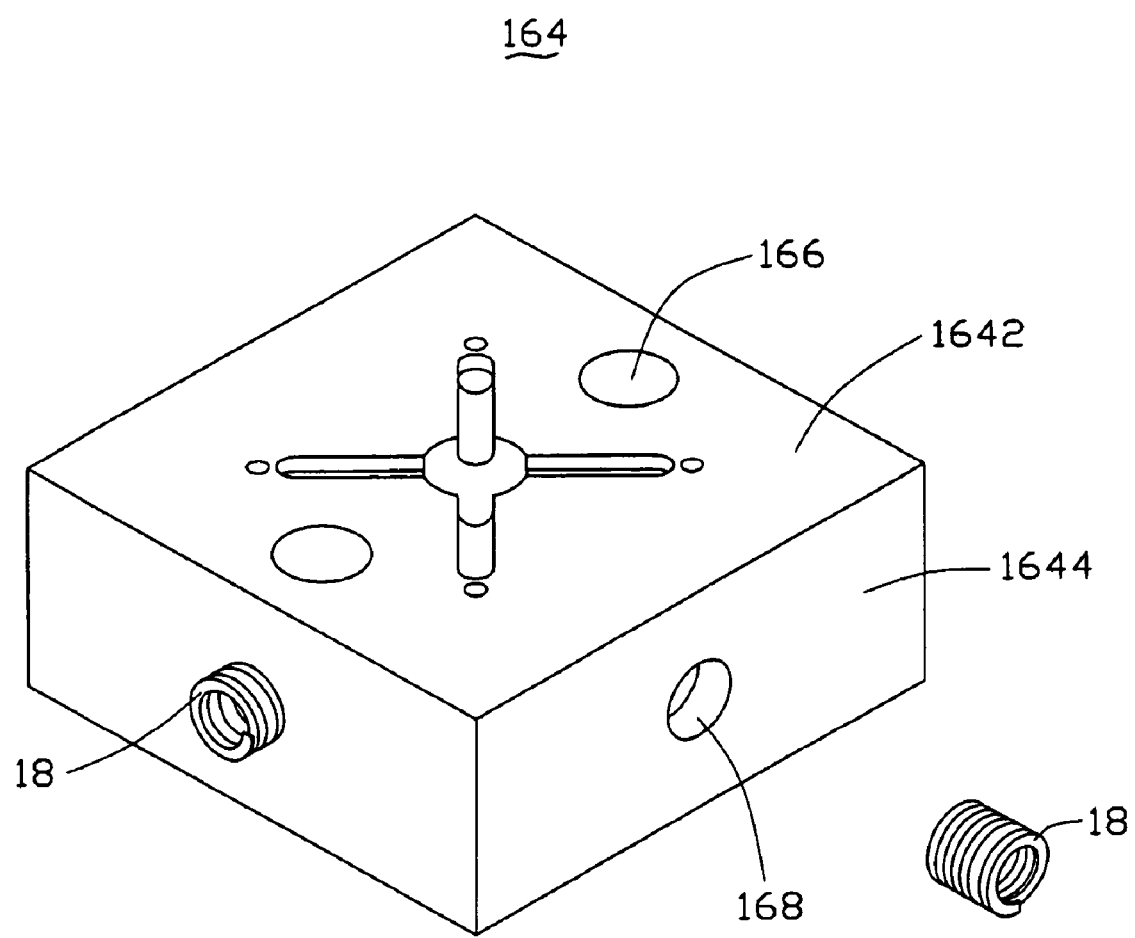
FIG. 3 is a three-dimensional view showing a structure of an upper core of FIG. 2.

Referring to FIG. 3, the upper core 164 has an upper molding surface 1642 and a plurality of side surfaces 1644. On the upper molding surface 1642, two symmetrical leading holes 166 are defined in the upper core 164. On the side surfaces 1644, receiving holes 168 are defined in the upper core 164, which are used to receive elastic elements 18. In the preferred embodiment, the elastic elements 18 are springs. The springs are compressed between the upper core 164 and the upper molding plate 16 to thereby support the upper core 164 whilst floating in the cavity 162. It is preferable that inner surfaces of the upper molding plate 16 facing the cavity 162 have corresponding holes to receive ends of the elastic elements 18, opposite ends of which are received in receiving holes 168 of the upper core 164.

Figure 4:
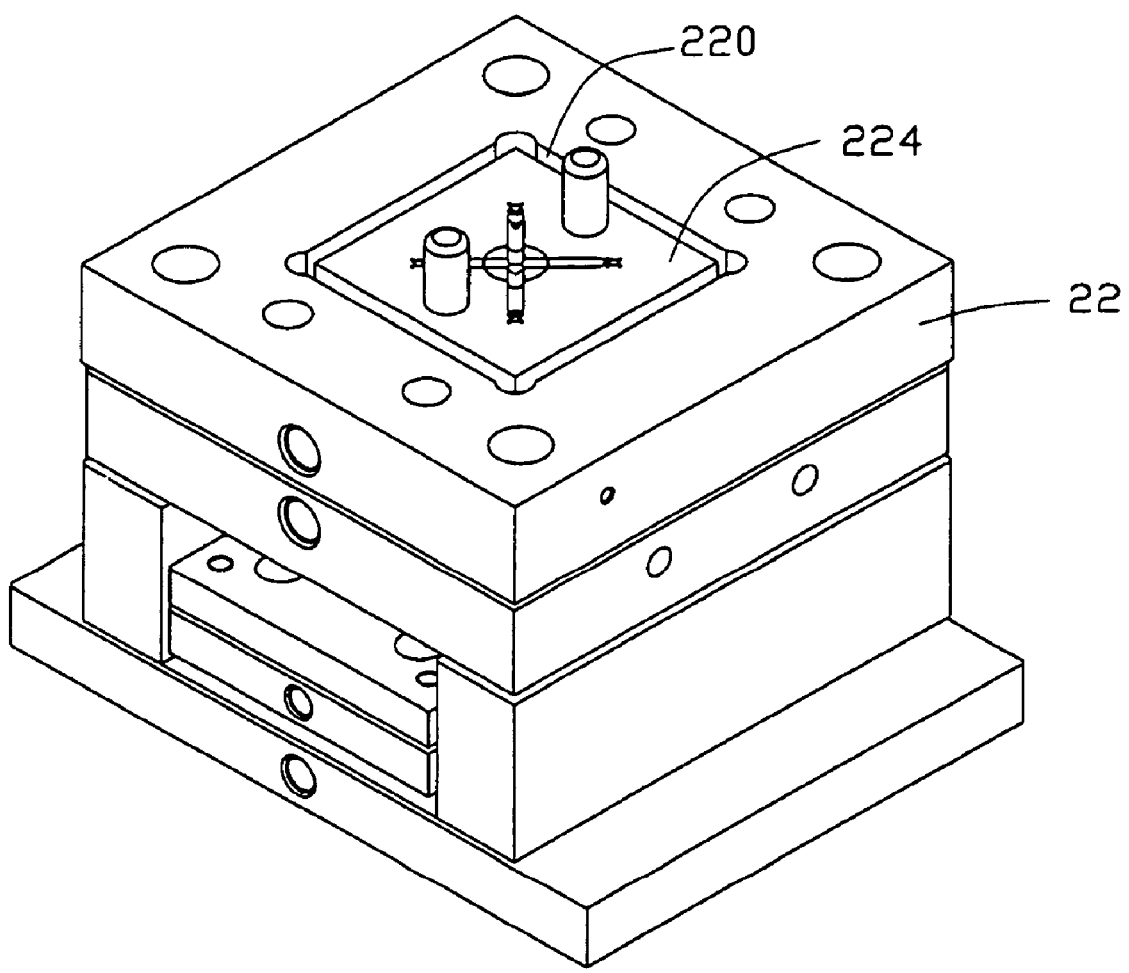
FIG. 4 is a schematic, isometric view showing a structure of a bottom mold of FIG. 1.

Referring to FIG. 4, the bottom mold 20 comprises a bottom molding plate 22 matching with the upper molding plate 16. Except for the bottom molding plate 22, the bottom mold 20 can also comprise other components of the art, and should not be restricted by FIG. 4. A bottom receiving cavity 220 is defined in a center of the bottom molding plate 22. A bottom core 224 is received in the bottom receiving cavity 220. A cubage of the bottom receiving cavity 220 is larger than a volume of the bottom core 224, the bottom molding plate 22 and the bottom core 224 are assembled in clearance fit shape, that is, they are not just compactly configured with each other. Thus the bottom core 224 is movable in the bottom receiving cavity 220, relative to the bottom molding plate 22. A thickness of the bottom core 224 could be equal to, or larger than a depth of the bottom receiving cavity 220.

Figure 5:
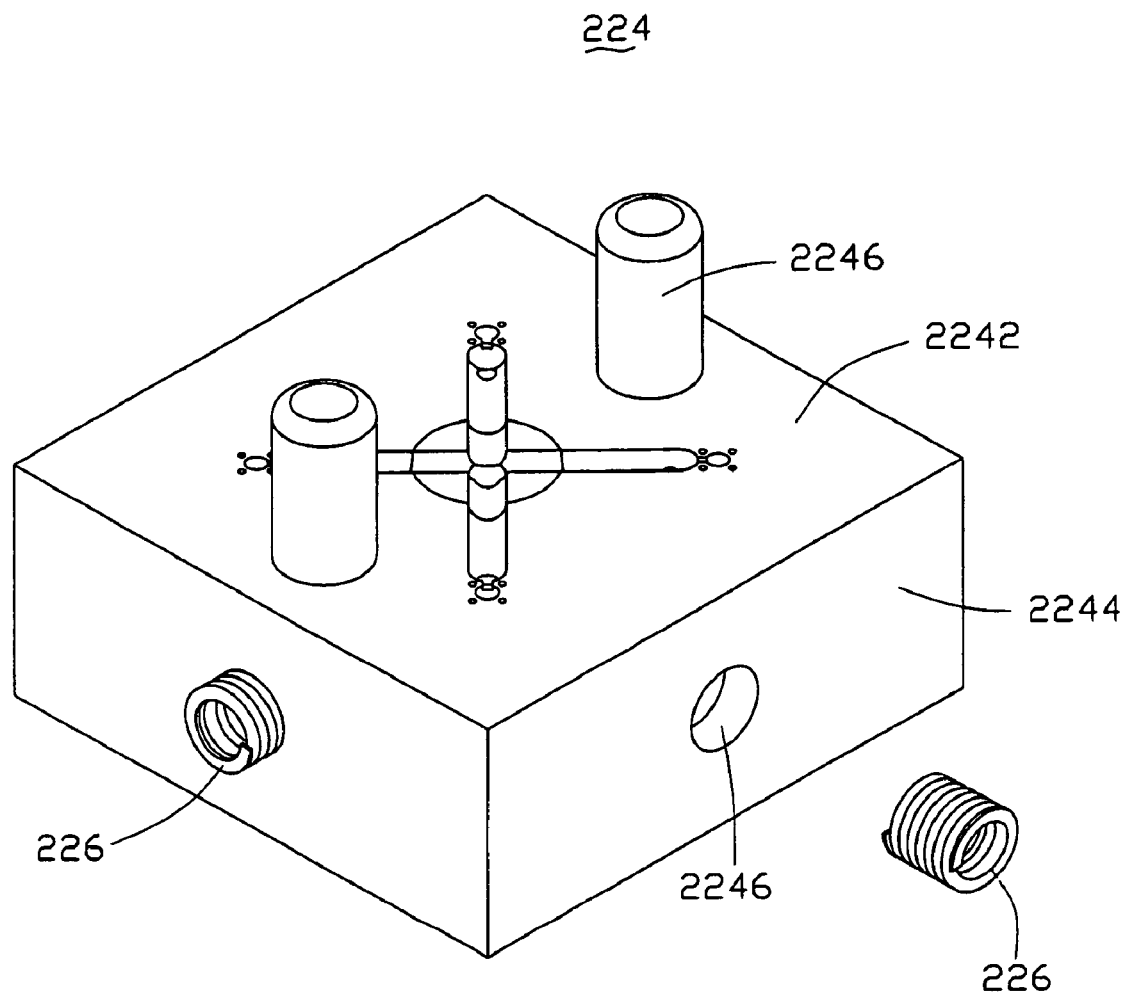
FIG. 5 is a schematic view showing a structure of a bottom core of FIG. 4.
Figure 6A:
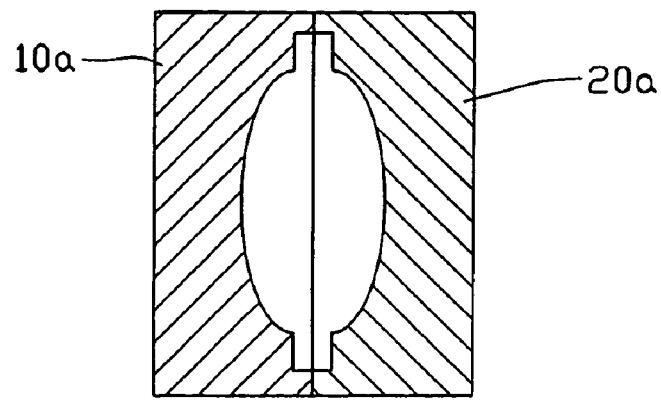
FIG. 6A is a schematic, cross-sectional view of a conventional mold being properly assembled.
Figure 6B:
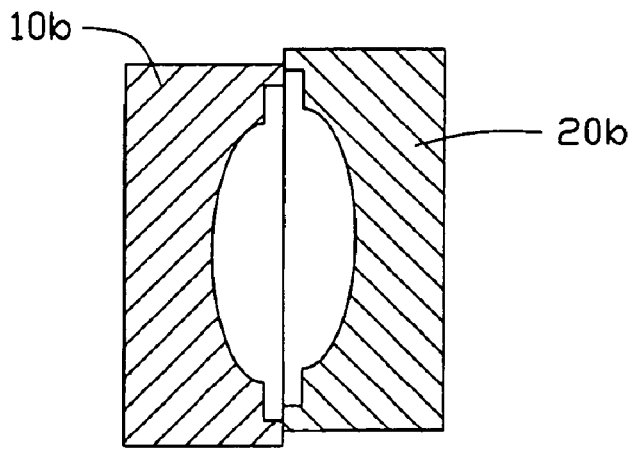
FIG. 6B is a schematic, cross-sectional view of a conventional mold being staggered assembled.
Figure 6C:
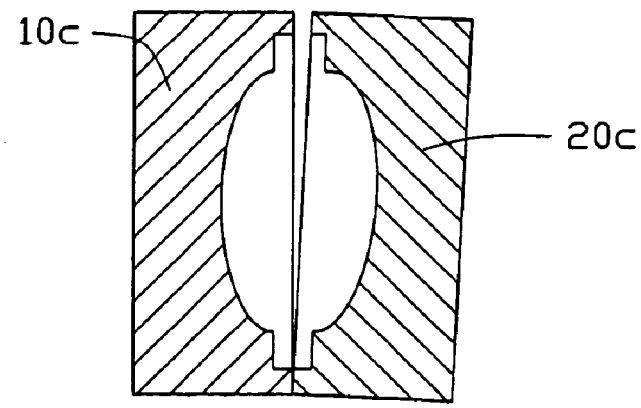
FIG. 6C is a schematic, cross-sectional view of a conventional mold being leanly assembled.
Figure 7A:
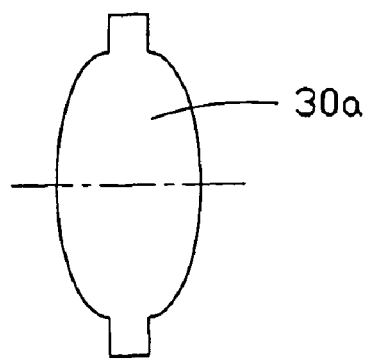
FIG. 7A is a schematic, cross-sectional view of an optical lens product manufactured by the mold of FIG. 6A.
Figure 7B:
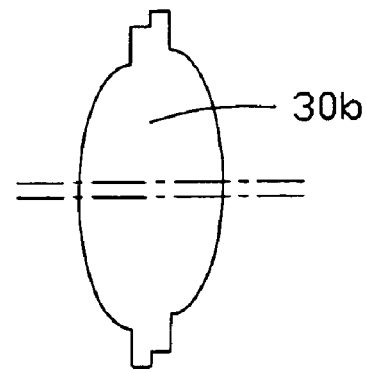
FIG. 7B is a schematic, cross-sectional view of lens product manufactured by the mold of FIG. 6B.
Figure 7C:
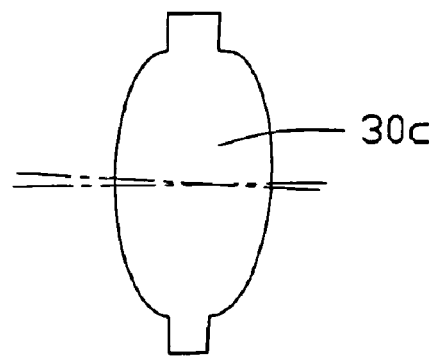
FIG. 7C is a schematic, cross-sectional view of lens product manufactured by the mold of FIG. 6C.

Referring to FIG. 5, the bottom core 224 has a bottom molding surface 2242 and a plurality of side surfaces 2244. The bottom molding surface 2242 is configured for cooperating with the upper molding surface to form products. On the top surface 2242, two symmetrical leading cylinders 2246 are configured on the bottom core 224, which extend outwards from the top surface 2242. The leading cylinders 2246 are configured to match with the leading holes 168 of the upper mold 10. A diameter of the leading cylinders 2246 is equal to or slightly less than that of the leading holes 168. Each leading cylinder 2246 has an outer surface, each leading hole 168 has an inner surface, and the outer surface of the leading cylinders 2246 and the inner surface of the leading holes 168 are all smooth. Accordingly, the upper mold 10 and the bottom mold 20 are movable relative to each other without frictional resistance. On the side surfaces 2244, receiving holes 2246 are defined in the bottom core 224, which are used to receive elastic elements 226. In the preferred embodiment, the elastic elements 226 are springs.

Referring to FIGS. 2 and 4, the upper core 164 and the bottom core 224 could be assembled by a typical assembly method of the art. In operation, leading holes 166 and leading cylinders 2246 can guide the relative movement between the upper core 164 and the bottom core 224. In addition, the upper core 164 is embedded in the upper molding plate 16 in floating shape, and the bottom core 224 is embedded in the bottom molding plate 22 in floating shape. Thus, precision of products made by the mold can be improved by improving precision of the leading holes 166 and the leading cylinders 2246. Firstly, when the upper molding plate 16 and the bottom molding plate 22 have relatively low accuracy, precision of the products can be improved by adjusting the relative relationship between the upper molding core 164 and the bottom molding core 224. Secondly, when the upper molding plate 16 and the bottom molding plate 22 can only be assembled imprecisely, adjusting the relative relationship between the upper core 164 and the bottom core 224 can get a more accurate assembly. Therefore, manufacturing error from the mold itself, and assembling error between the upper molding plate 16 and the bottom molding plate 22 are counteracted and will not affect precision of the products.

Selectively, following embodiments could also be workable according to the spirit of the invention, which are listed below: the upper core is embedded into the upper molding plate in clearance fit shape, at the same time, the bottom core is assembled to the bottom molding plate in conventional interference fit shape; or the bottom core is fixed to the bottom molding plate via fasteners. In the same way, the bottom core is embedded into the bottom molding plate in clearance fit shape, the upper core is assembled to the upper molding plate in conventional interference fit shape, or the upper core is fixed to the upper molding plate via a fastener. To acheive high precision and good assembly, leading holes and leading cylinders can also be used to lead shutting off in the above embodiments.

Alternatively, the mold can be comprised either of an upper molding core or a bottom molding core which has a non-flat molding surface. The corresponding bottom molding core or upper molding core has a flat molding surface. A leading mechanism, such as leading hole and leading cylinder, is also needed to lead the relative motion between the upper molding core and the bottom molding core. This flat molding surface is configured for forming a flat surface of a product.

The mold of the embodiments herein can also be used in the fields of heat shrinking molds and core-casting molds.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mold apparatus comprising:
an upper mold having an upper molding plate and an upper molding core;
a bottom mold having a bottom molding plate for matching with the upper molding plate and a bottom molding core, the upper and the bottom molding cores each having a molding surface configured for forming products; and
a plurality of elastic elements each having a first end and a second end which are opposite ends of the elastic element;
wherein one of the upper molding plate and the bottom molding plate defines a receiving cavity with a plurality of first receiving holes defined in peripheral inner side walls of the receiving cavity and configured for receiving the respective first ends of the elastic elements, a corresponding one of the upper molding core and the bottom molding core having a plurality of second receiving holes defined in peripheral outer side walls thereof and configured for receiving the respective second ends of the elastic elements, the corresponding one of the upper molding core and the bottom molding core being floatingly received and movable in the receiving cavity by force of the elastic elements.

2. The mold apparatus in accordance with claim 1, wherein a guiding mechanism is formed between the upper molding core and the bottom molding core for guiding relative movement therebetween.

3. The mold apparatus in accordance with claim 2, wherein the guiding mechanism comprises guiding cylinders extending from one of the upper molding core and the bottom molding core, and guiding holes defined in the other one of the upper molding core and the bottom molding core.

4. The mold apparatus in accordance with claim 1, wherein a size of the receiving cavity is larger than that of the corresponding one of the upper molding core and the bottom molding core.

5. The mold apparatus in accordance with claim 1, wherein the other one of the upper molding plate and the bottom molding plate defines an additional receiving cavity and the corresponding other one of the upper molding core and the bottom molding core is floatingly received and movable in the additional receiving cavity.

6. The mold apparatus in accordance with claim 5, wherein a thickness of each of the upper core and the bottom core is equal to, or larger than a depth of the corresponding receiving cavity.

7. The mold apparatus in accordance with claim 1, wherein the other one of the upper molding plate and the bottom molding plate defines an additional cavity and the corresponding other one of the upper molding core and the bottom molding core is interferentially and fixedly received in the additional receiving cavity.

8. The mold apparatus in accordance with claim 1, wherein the other corresponding one of the upper molding plate and the bottom molding plate is integrally formed with the other corresponding one of the upper molding core and the bottom molding core thereof.

9. The mold apparatus in accordance with claim 8, wherein the molding surface of the other corresponding one of the upper molding core and the bottom molding core is flat for forming flat surfaces of the products.

10. The mold apparatus in accordance with claim 3, wherein an axis of compression and decompression of each of the elastic elements is perpendicular to a central axis of each of the guiding holes.

* * * * *